United States Patent [19]

McKay

[11] Patent Number: 4,515,496

[45] Date of Patent: May 7, 1985

[54] SECURING ASSEMBLY

[76] Inventor: Stewart K. McKay, National Park Rd., Canungra, Queensland, Australia, 4275

[21] Appl. No.: 475,652

[22] Filed: Mar. 15, 1983

[51] Int. Cl.³ .............................................. B25G 3/36
[52] U.S. Cl. ................................... 403/388; 403/408; 403/393
[58] Field of Search ............... 403/388, 408, 298, 393, 403/405, 406, 384; 411/427, 182, 394, 308, 309, 310, 311; 248/188

[56] References Cited

U.S. PATENT DOCUMENTS

| | | | |
|---|---|---|---|
| 204,036 | 5/1878 | Harvey | 411/308 |
| 1,066,421 | 7/1913 | Russell | 411/394 X |
| 2,643,706 | 6/1953 | Brown | 403/388 |
| 2,704,870 | 3/1955 | Becker | 248/188 X |
| 3,228,716 | 1/1966 | Parkin | 403/388 X |
| 3,352,195 | 11/1967 | Fisher | 403/406 X |
| 4,240,323 | 12/1980 | Kojima | 411/182 X |

FOREIGN PATENT DOCUMENTS

| | | | |
|---|---|---|---|
| 480047 | 2/1938 | United Kingdom | 403/388 |
| 879163 | 10/1961 | United Kingdom | 403/388 |

Primary Examiner—Dennis L. Taylor
Attorney, Agent, or Firm—Sughrue, Mion, Zinn, Macpeak and Seas

[57] ABSTRACT

A securing assembly for securing together a pair of adjacent round tubular frame members each having a pair of co-aligned apertures includes a elongated fastener, having an enlarged diameter central portion and reduced diameter end portions each of which is provided with a plurality of retaining projections. The enlarged central portion is adopted to fit in the two inner apertures and a pair of cap members having internal blind bores are fitted over the retaining projections and are disposed in the outer apertures. The retaining projections are each comprised of a continuous helical ridge of angular shape sloped toward the central portion and the internal blind bore of each cap member may have a plurality of unthreaded retaining ribs.

5 Claims, 8 Drawing Figures

U.S. Patent  May 7, 1985  Sheet 1 of 2  4,515,496
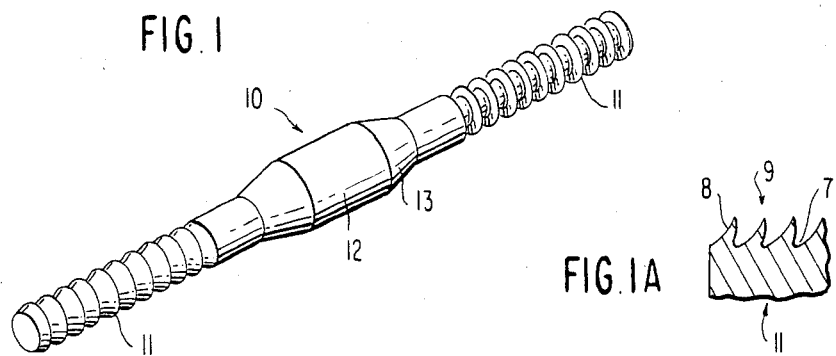
FIG. 1
FIG. 1A
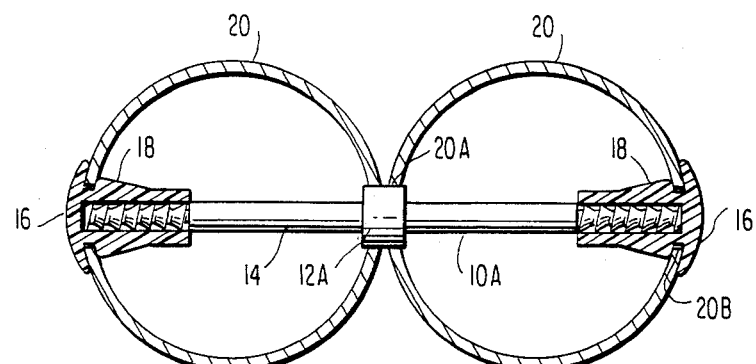
FIG. 2
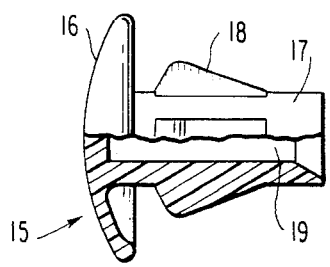
FIG. 3
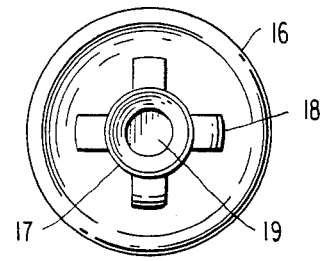
FIG. 4

4,515,496

SECURING ASSEMBLY

This invention relates to a method of connection of frame members such as tubular or channel shaped members and a connector for use in the method.

Hitherto the connection of adjacent tubular members has been largely accomplished by welding or riveting if a permanent attachment was required or by a bolt inserted through co-aligned apertures in the adjacent tubular members if a releasable attachment was sometimes desired. In this latter type of attachment in some cases a single bolt was passed through mutually adjoining apertures in adjacent walls of the tubular member and fastening nuts were attached to each end of the bolt whereby each fastening nut was located in the bore of each tubular member. This method was difficult to achieve in practice because of difficulty in obtaining access to the respective bores of each tubular member. In other cases a first pair of co-aligned apertures were provided in one tubular member and a second pair of co-aligned apertures were provided in the other tubular member. The first and second pairs of apertures were then placed in mutual registry and a single bolt passed through each respective pair of apertures and fastening nuts were then applied to the other ends of the bolt which projected from the respective outer apertures of each tubular member. This latter method was not only unsightly in appearance but was also undesirable in that projecting end portions of bolt extended outwardly from the assembly of attached tubular members.

It is therefore an object of the invention to provide a method of connection of frame members which alleviates the problems associated with the prior art as described above.

The method of the invention includes the following steps:

(i) inserting an elongate fastener through two pairs of co-aligned apertures located in mutually adjacent frame members thereby forming two outer apertures and two inner adjoining apertures wherein each aperture is substantially in registry with each other; and (ii) locating each end of the fastener in a cap member provided in each outer aperture in an internal bore thereof.

In another aspect the invention provides a securing assembly for connecting adjacent frame members having two pairs of co-aligned apertures thereby forming two outer apertures and two inner adjoining apertures including an elongate fastener having a plurality of retaining projections at each end thereof, an intermediate boss or raised portion for engagement with said inner apertures, and a pair of cap members wherein each cap member is locatable in an associated outer aperture and is engageable with an associated end of the elongate fastener in an internal bore thereof.

Preferably in step (i) a cap member is located on one end portion of the fastener which is suitably a bolt and the bolt is then inserted through the two pairs of apertures so that the cap member engages with one of the outer apertures. A second cap member may then be attached to the other end portion of the bolt which may protrude from the other outer aperture. The complete assembly of bolt and cap members may then be tightened to securely clamp the adjacent frame members to each other by application of a hammer to one cap member while the other cap member abuts a block or other appropriate support.

Most suitably the method of the invention is applied to a tubular frame member of circular or elliptical cross section. However the method of the invention may also be applied to other tubular member such as those having a square or rectangular cross section. The method of the invention may also be applied to channel shaped frame members (e.g. those having a cross section in the shape of a U, V or W).

The bolt for use in the process of the invention may have a shank of uniform cross section therethrough. Alternatively the bolt may be provided with a raised portion or boss intermediate its ends and more preferably centrally thereof which preferably is round or circular in cross section. This central boss is suitably such that it locates in the inner apertures of the mutually adjacent frame members and thus this feature facilitates the retention of the bolt within both pairs of apertures. The central boss is useful in that it inhibits any shearing action by the bolt in relation to the frame members and maintains the whole assembly in a state of compression.

Each end of the bolt may be provided with one or more retaining projections and is more suitably screw threaded and preferably a relatively coarse and deep thread is adopted. Suitably the helical ridge forming the thread is of saw tooth shape having a ramped or rearwardly sloping front surface and also having an undercut or recess provided in a rear surface thereof when the bolt is viewed in side elevation. The terms "front" and "rear" in this embodiment have relevance to an adjacent end of the bolt. The provision of the saw teeth and the recess make removal of the bolt a difficult task when used for attachment of adjacent frame members. The ramped front surface makes it easier to assemble one end of the bolt and an associated cap member.

Each cap member is suitably T shaped having a head portion and a shank having internal bore of constant cross section which is preferably unthreaded. Preferably the internal bore has one or more retaining ribs and is more suitably trilobular or is substantially in the shape of an equilateral triangle having rounded vertices. If desired the cap member may be provided with one or more retaining barbs adjacent the head portion to assist in being retained within an associated outer aperture of a respective frame member. This latter feature is also useful in that it enables the cap member to be used as a hole or aperture plug and thus eliminate the presence of unfilled holes or apertures in the frame members.

If desired the shank of the bolt may also have one or more retaining ribs and is more suitably trilobular if desired. The cap members preferably have an unthreaded internal bore because when the end of the bolt is inserted into the internal bore suitably assisted by application of a hammer the threaded end of the bolt buts its own thread in the internal bore and acts as a self-tightening clamp.

Reference may now be made to the attached drawings illustrating a preferred embodiment of the invention. In these drawings FIG. 1 is a perspective view of a bolt for use in the method of the invention including a detailed view of the thread profile utilized therein:

FIG. 1A is a detailed view of a threaded profile of one end of the bolt;

FIG. 2 is a view showing the attachment of two frame members to each other using the method of the invention using the cap member of FIG. 3 hereinafter and a bolt different to that shown in FIG. 1;

FIG. 3 is a side view of a cap member for use in the method of the invention;

FIG. 4 is a front view of the cap member shown in FIG. 3;

Figure 5:
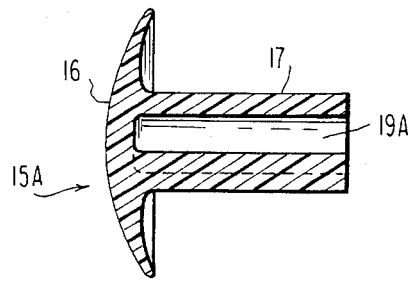
FIG. 5 is a side view of a modified cap member for use in the method of the invention.
Figure 6:
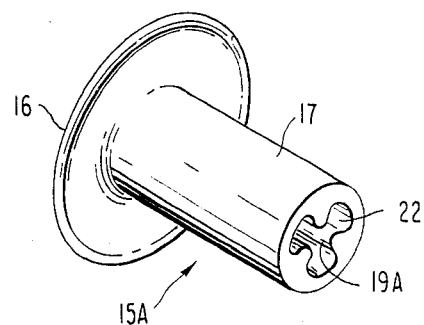
FIG. 6 is a perspective view of the cap member of FIG. 5.

In FIGS 1-4 there is shown bolt 10 having threaded ends 11 and central boss 12 with bevelled ends 13 as well as shank 14. As shown in the detailed view of the thread profile each threaded end 11 includes a continuous helical ridge 9 and a ramped front surface 8. There is also shown an undercut or recess 7 in a rear surface of helical ridge 9. There is also shown cap member 15 having head 16, shank 17, retaining barb 18 and a blind internal bore 19. Mutually adjacent frame members 20 are attached as shown in FIG. 2, wherein heads 16 of cap members 15 bear against the outer surfaces of frame members 20 as shown. Retaining barbs 18 retain each cap member 15 within the interior of each frame member 20. The threaded ends 11 of bolt 10A engage within each internal bore 19 of cap members 15 as shown cutting their own thread therein. Bolt 10A includes a central boss 12A which is long enough to engage the adjacent inner apertures 20A of frame members 20. There is also shown outer apertures 20B to retain heads 16 of cap members 15. FIGS 5-6 illustrates a modified cap member 15A having head 16, shank 17 and internal bore 19A which is of tubular cross section as shown in FIG. 6 having three lobes 22.

Figure 7:
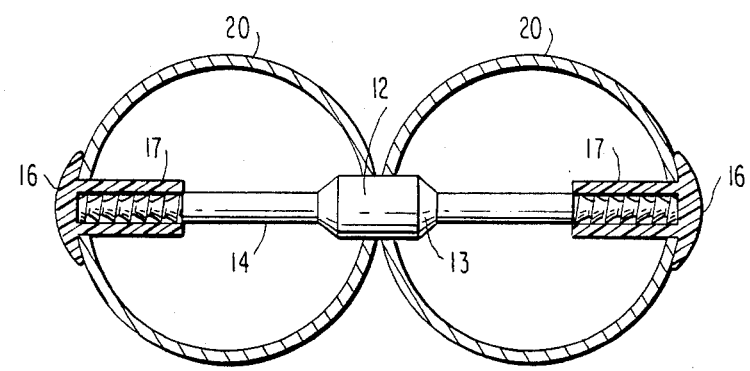
FIG. 7 is a view showing the attachment of two frame members to each other.

FIG. 7 shows bolt 10 interconnecting frame members 20 as described above in relation to FIG. 2. Cap members 15A do not have retaining barbs 18 as shown and boss 12 is longer having tapered ends 13 when compared to boss 12A shown in FIG. 2.

Preferably the cap members 15 and 15A are formed from plastics material so that head portions 16 are resiliently deformable relative to their associated shanks 17.

The invention aso includes within its scope a securing assembly for attachment of adjacent frame members which includes the bolt and cap members as described above.

I claim:

1. A securing assembly for securing together a pair of adjacent round tubular frame members having two pairs of co-aligned apertures defining two outer apertures and two inner adjoining apertures comprising an elongated fastener element for interconnecting said tubular frame members having a plurality of retaining projections at each end thereof and an intermediate raised portion adapted to engage the two inner adjoining apertures in said tubular frame members, said intermediate raised portion having external dimensions substantially identical to the internal dimensions of said inner adjoining apertures and a pair of cap members each having an arcuate head portion and a shank adapted to be located in each of said 2 outer apertures, each shank having an internal blind bore in which the respective end of said elongated fastener element is secured by means of said retaining projections whereby said arcuate head portion of each cap member is adapted to abut a curved adjacent surface of a respective tubular frame member and said intermediate raised portion inhibits any shearing action by the elongated fastener element and maintains said securing assembly in a state of compression.

2. A securing assembly is set forth in claim 1 wherein the respective ends of said elongated fastener element are threaded with a continuous helical ridge of sawtoothed shape with each ridge sloping toward said raised center portion to define an undercut portion for each thread.

3. A securing assembly is set forth in claim 1 wherein said internal blind bore of each cap member is provided with at least one retaining rib.

4. A securing assembly is set forth in claim 3 wherein said internal bore is trilobular in shape.

5. A securing assembly as set forth in claim 3 wherein said internal bore is unthreaded.

* * * * *